(No Model.)
L. C. WILEY.
TIRE BOLT WRENCH.
No. 598,831. Patented Feb. 8, 1898.
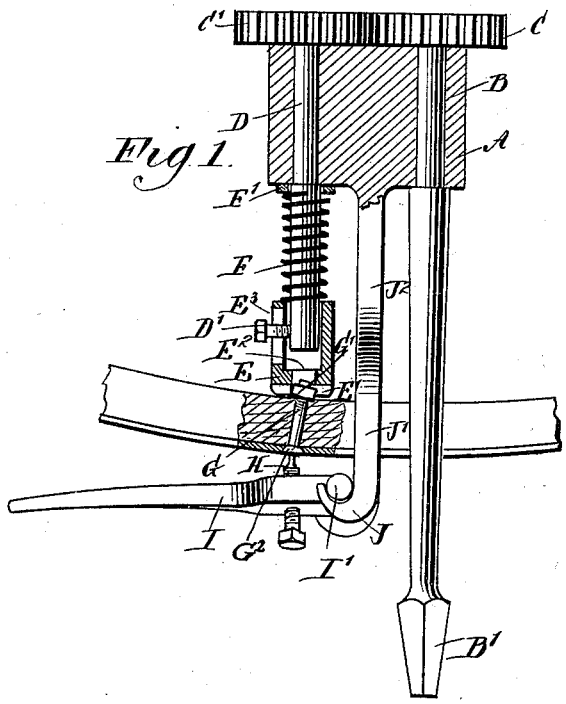
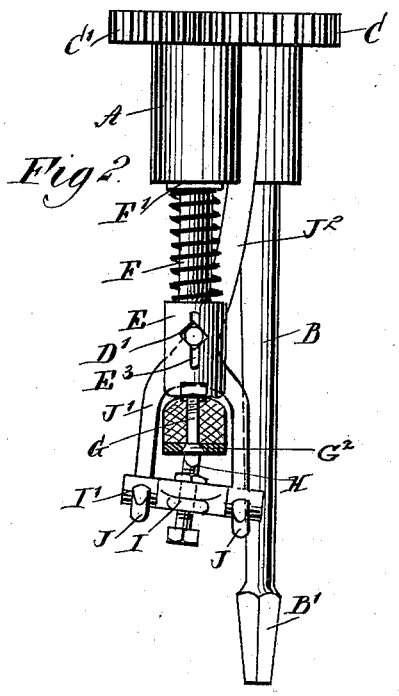
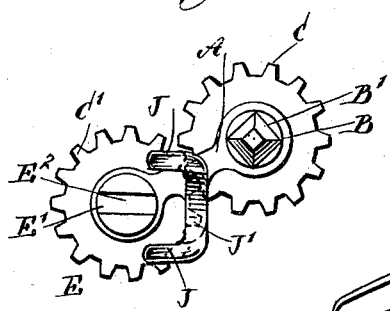
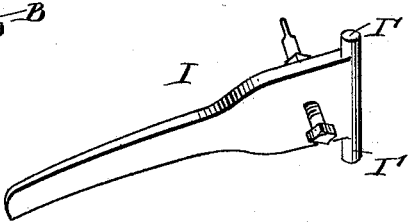
WITNESSES:
INVENTOR
L. C. Wiley,
BY
ATTORNEYS.

UNITED STATES PATENT OFFICE.

LEWIS C. WILEY, OF SMILEY, TEXAS.

TIRE-BOLT WRENCH.

SPECIFICATION forming part of Letters Patent No. 598,831, dated February 8, 1898.

Application filed November 4, 1897. Serial No. 657,371. (No model.)

*To all whom it may concern:*

Be it known that I, LEWIS C. WILEY, of Smiley, in the county of Gonzales and State of Texas, have invented a new and Improved Tire-Bolt Wrench, of which the following is a full, clear, and exact description.

The object of the invention is to provide a new and improved wrench which is simple and durable in construction and more especially designed for conveniently and quickly screwing up or unscrewing the nuts on bolts used for holding the tire to the rim of the wheel.

The invention consists principally of a frame formed with a hook-bearing, a shaft revoluble in the said frame and carrying a socket for engagement with the bolt-nut, and a trunnioned lever for removable connection with the head of the bolt.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a plan view of the improvement as applied and with parts in section. Fig. 2 is a side elevation of the same with the rim and tire of the wheel in section. Fig. 3 is a front elevation of the improvement with the lever removed, and Fig. 4 is a perspective view of the lever.

The improved wrench is provided with a suitably-constructed frame A, in which is journaled the transversely-extending shaft B, formed at its forward end with a polygonal head $B'$ for engagement with the chuck of an ordinary brace for rotating the shaft B in its bearing in the frame A.

On the rear end of the shaft B is secured a gear-wheel C in mesh with a gear-wheel $C'$, secured on a second shaft D, likewise journaled in the frame A and loosely supporting at its forward end a socket E, resting on a spring F, coiled on the shaft D and abutting with its rear end on a washer $F'$, held on the shaft D next to the frame A. The socket E is free to slide on the shaft D and is formed at its forward end with a diametrical recess $E'$ of a width corresponding to the width of the nut $G'$ of a bolt G, held in the rim and the tire of the wheel, as is plainly indicated in Fig. 2. An opening $E^2$ is also formed in the socket E for the passage of the projecting end of the bolt G when the nut $G'$ is engaged by the walls of the recess $E'$, as indicated in the said figure.

In order to prevent the socket E from accidental disconnection from the shaft D, I provide one side of the socket with an elongated slot $E^3$, through which passes a screw $D'$, screwing in the shaft D, to cause the socket to turn with the shaft and to slide freely thereon and to prevent the socket from accidentally sliding off the said shaft. The head $G^2$ of the bolt is adapted to be engaged by the chisel end of a tool H, adjustably held in a lever I, formed with trunnions $I'$ for removable engagement with hooked bearings J, formed on the forked end $J'$ of a post $J^2$, projecting forward from the frame A, and through the forked end $J'$ of which passes the rim and tire of the wheel, as plainly shown in Figs. 1 and 2. By the arrangement described the lever I can be readily placed in position with its trunnions on the hook-bearings, so as to swing the lever inward to engage the tool H with the head $G^2$ of the bolt G and with the rim and tire passing through the forked end $J'$, as plainly indicated in Figs. 1 and 2. At the same time the nut $G'$ of the bolt is engaged by the socket E, and when the operator now turns the brace held on the head $B'$ of the shaft B then the rotary motion given to the shaft B is transmitted to the shaft D by the gear-wheels C $C'$, and the rotary motion of the shaft D is transmitted by the screw $D'$ to the socket E, so that the nut $G'$ is screwed up or unscrewed from the bolt G, according to the direction in which the brace is turned. As the operator bears on the lever I the bolt G is prevented from turning during the unscrewing or screwing up of the nut, so that this latter operation is very quickly accomplished.

By mounting the socket E yieldingly on the shaft D the said socket readily engages and remains in engagement with the nut $G'$, both in screwing up or unscrewing, as the socket is free to slide on the shaft and in the same direction in which the bolt extends.

It will be seen that by having the socket E loose on the shaft D the said socket readily accommodates itself to properly engage a nut on a bolt held angularly in the rim, it being understood that in shrinking the tire on the rim of the wheel the bolt-apertures frequently do not register and the bolt is caused to assume an angular position in the rim.

The bearings J are inclined slightly, so as to hold the lever I in a similar position relative to a possible angular position of the bolt, as above described, to insure a proper holding of the bolt by the tool H while screwing up or unscrewing the nut.

Having thus fully described my invention, I claim as new and desire to secure by Letters Patent—

1. A tire-bolt wrench, comprising a frame formed with a hook-bearing, a shaft revoluble in the said frame and having a spring-pressed socket for engagement with the bolt-nut, and a trunnioned lever for removable connection with the said bearing, and adapted to carry a tool for engagement with the head of the bolt, substantially as shown and described.

2. A tire-bolt wrench, provided with a frame, a post on the said frame, and formed at its forked end with hook-bearings slightly inclined, and a lever carrying a tool for engagement with the head of the bolt, the said lever having trunnions for removable connection with the said hook-bearings, to hold the lever in an inclined position, substantially as shown and described.

3. A tire-bolt wrench, provided with a frame, a shaft mounted to turn in the said frame, a socket fitted to slide on the said shaft, and mounted to turn therewith, and a spring pressing on the said socket, substantially as shown and described.

4. A tire-bolt wrench, provided with a yieldingly-mounted socket adapted to be rotated, and formed on its outer face with a diametrical recess for engagement with the nut of the bolt, substantially as shown and described.

LEWIS C. WILEY.

Witnesses:
 D. S. PEARCE,
 W. H. PERKINS.